Figure 1:
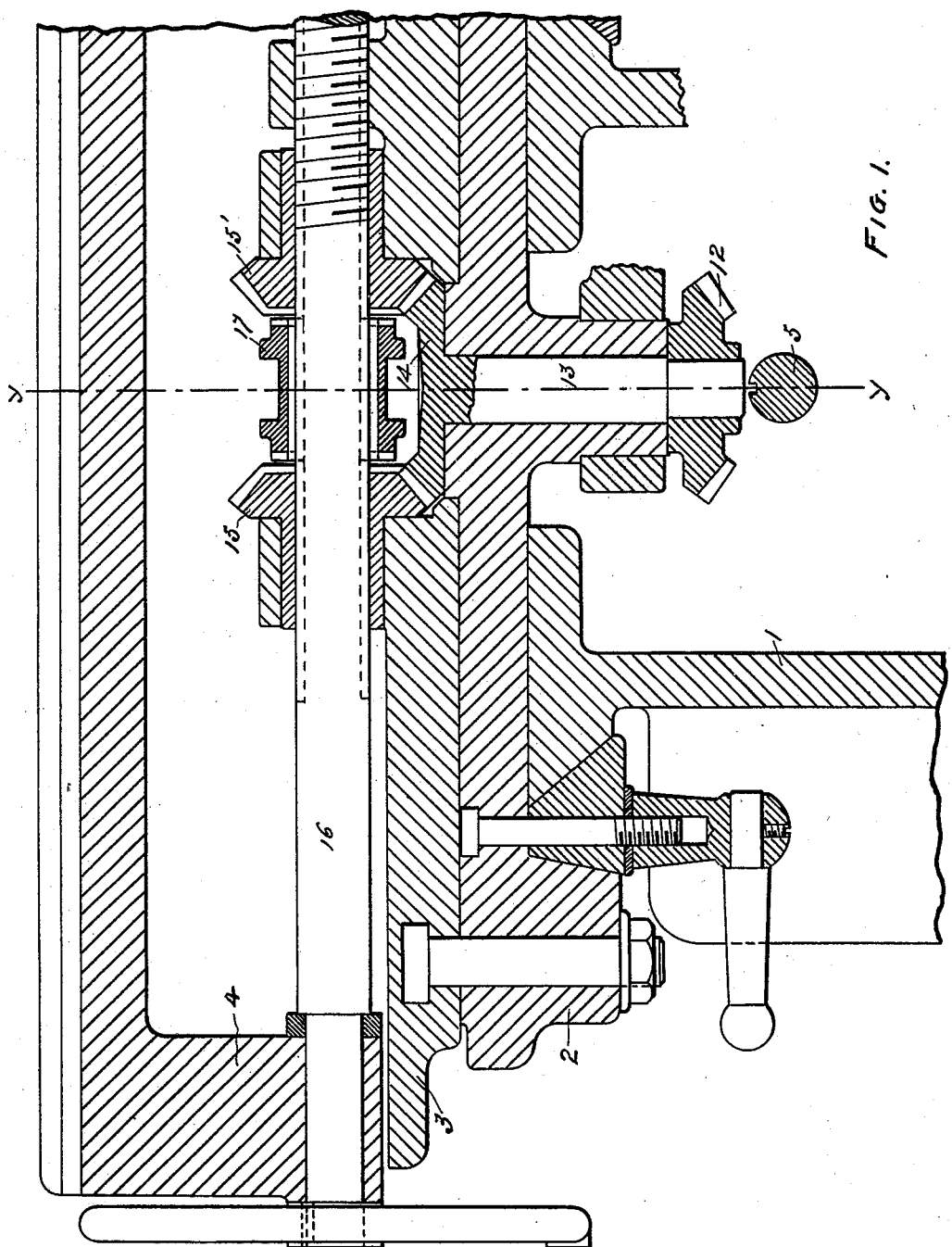

No. 718,514. PATENTED JAN. 13, 1903.
J. PARKER.
FEED TRIPPING MECHANISM.
APPLICATION FILED DEC. 17, 1900.
NO MODEL. 3 SHEETS—SHEET 1.

WITNESSES,
J. H. Thurston
C. G. Bradley.

INVENTOR,
John Parker
BY Wilmarth H. Thurston
ATT'Y.

UNITED STATES PATENT OFFICE.

JOHN PARKER, OF PROVIDENCE, RHODE ISLAND, ASSIGNOR TO THE BROWN AND SHARPE MANUFACTURING COMPANY, OF PROVIDENCE, RHODE ISLAND, A CORPORATION OF RHODE ISLAND.

FEED-TRIPPING MECHANISM.

SPECIFICATION forming part of Letters Patent No. 718,514, dated January 13, 1903.

Application filed December 17, 1900. Serial No. 40,129. (No model.)

*To all whom it may concern:*

Be it known that I, JOHN PARKER, of the city and county of Providence, State of Rhode Island, have invented certain new and useful Improvements in Feed-Tripping Mechanism; and I do hereby declare the following specification, taken in connection with the accompanying drawings, forming a part of the same, to be a full, clear, and exact description thereof.

The invention relates to mechanism for tripping or stopping the feed of a traveling carriage, table, or other member of a machine.

In the accompanying drawings the invention is shown as applied to a milling-machine for tripping the feed of the work-carrying table; but the invention is equally applicable for use in other relations where it is desired to automatically trip the feed of a moving part, and particularly where a reverse feed is employed.

Heretofore in feed-tripping mechanisms it has been customary to employ a single plunger arranged to slide in a part of the machine which does not travel and adapted to be depressed by dogs on the traveling member, the depression of said plunger acting through suitable connections to throw out the clutch through which revolution is imparted to the feed-screw. With this arrangement, as the traveling carriage or member comes to rest with one of the dogs on the carriage directly above the plunger, the clutch cannot be again thrown into engagement with the feed-screw to feed the carriage in the reverse direction, because the clutch cannot be shifted without raising the plunger, and this is prevented by the contact of the dog therewith. Consequently it has been necessary to feed the carriage back by hand for a sufficient distance to cause the dog to clear the plunger before the clutch can be shifted to automatically feed the carriage in the reverse direction.

One object of the present invention is to obviate the necessity for thus feeding back the carriage by hand and to enable the clutch to be at once shifted to throw in the automatic feed.

To this end the invention consists, primarily, in the employment of two plungers connected with the shifting clutch and adapted to be depressed or actuated by the dogs on the traveling carriage to shift the clutch, one of said plungers serving to shift the clutch in one direction and the other plunger serving to shift the clutch in the opposite direction.

A further feature of invention consists in the combination, with said plungers, of a stop or stops which may be set so as to permit the clutch to be shifted in either direction or may be set so as to permit the clutch to be shifted in one direction, but to prevent its being shifted in the opposite direction.

The invention also consists of certain combinations and arrangements of parts hereinafter described and claimed.

Figure 2:
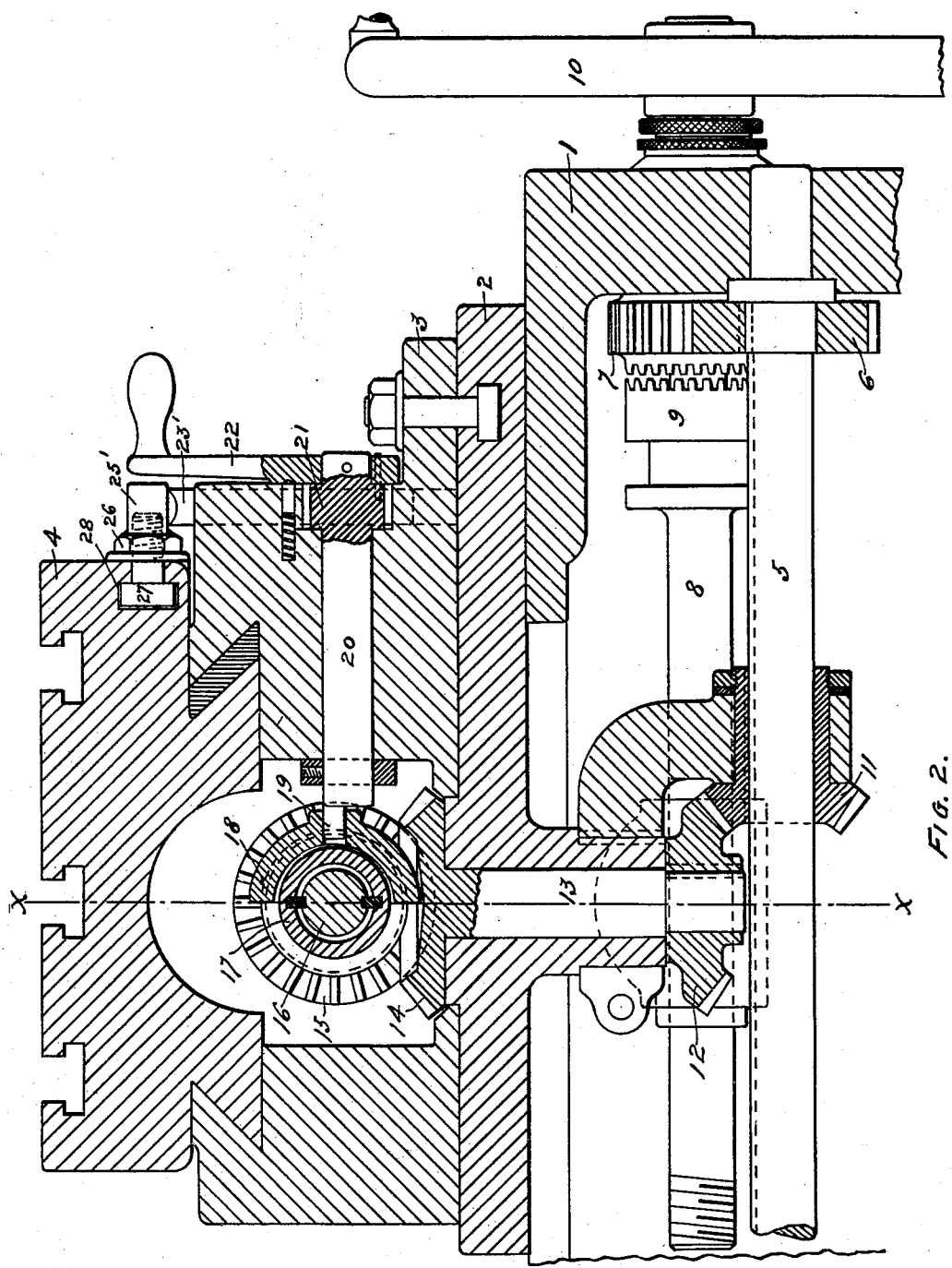
Figure 3:
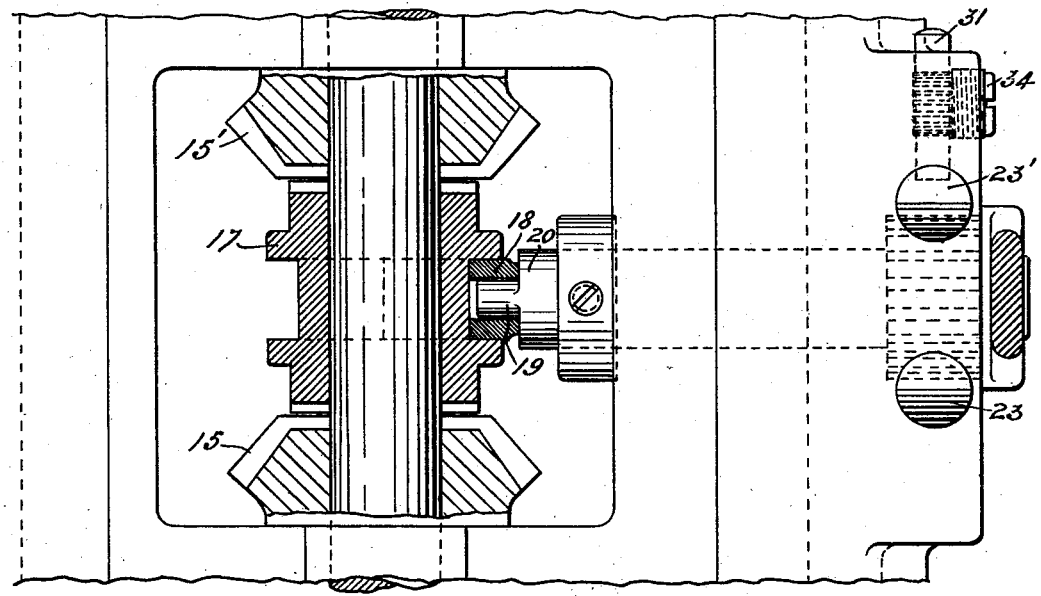
Figures 4, 5:
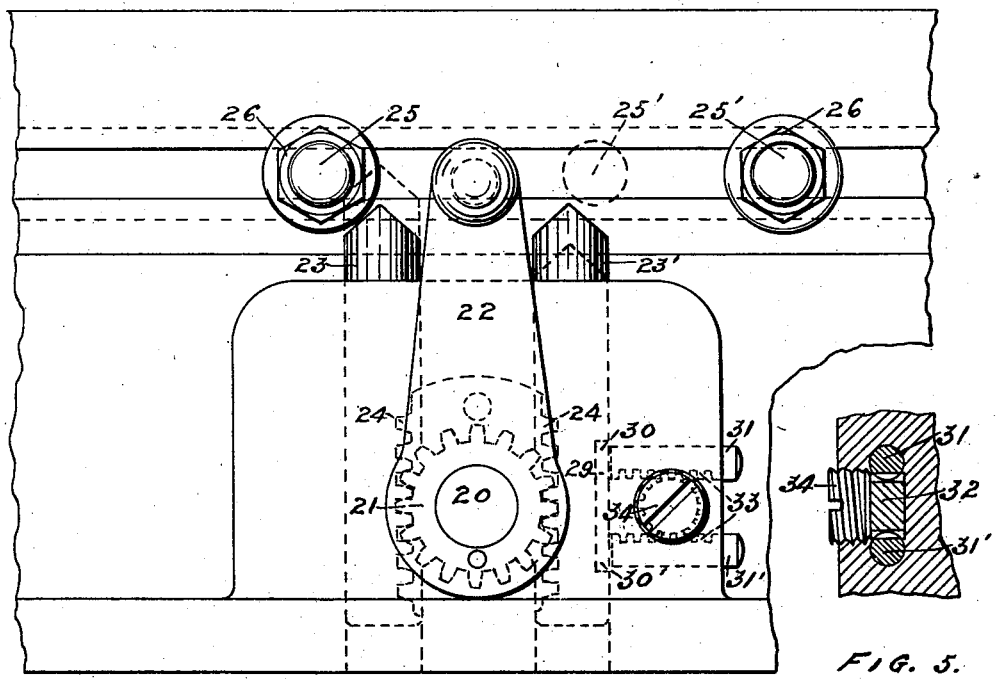

Referring to the drawings, Figure 1 is a longitudinal section of a portion of a milling-machine, taken on the line $x\,x$, Fig. 2. Fig. 2 is a transverse section on the line $y\,y$, Fig. 1. Fig. 3 is a plan view, partly in section, on a larger scale, showing the shifting clutch and the mechanism for operating it. Fig. 4 is a front view showing the tripping mechanism, and Fig. 5 is a detail.

1 represents a portion of the knee of a milling-machine, 2 the saddle, 3 the swivel bed, and 4 the work-table, all of the usual construction and arrangement.

5 is the shaft, usually driven from the spindle of the milling-machine, from which the power is taken for the cross-feed of the saddle and for the feed of the work-table.

6 is the spur-gear on the shaft 5, which meshes with the gear 7, loosely mounted on the cross-feed screw 8, to which it is adapted to be connected by means of the shifting clutch 9 to revolve the cross-feed screw 8, which screw when the clutch 9 is disconnected from the gear 7 may be rotated by the hand-wheel 10.

To the shaft 5 is secured the bevel-gear 11, which meshes with the bevel-gear 12, secured to the short shaft 13, mounted in the saddle. The shaft 13 carries at its opposite end another bevel-gear 14, which meshes with the two bevel-gears 15 15', loosely mounted on the work-table feed-screw 16.

17 is the shifting clutch, mounted on the feed-screw 16 between the bevel-gears 15 15' and connected to said feed-screw by a spline-and-groove connection, so as to revolve with the screw, but so as to be capable of sliding thereon.

The parts thus far described are of the usual construction.

Arranged loosely in the groove of the clutch 17 is a clutch shoe 18, provided with a hole adapted to receive the eccentric-pin 19, projecting from the inner end of the rock-shaft 20, mounted in the swivel-bed. This rock-shaft carries at its outer end a pinion 21 and a hand-lever 22. Arranged to slide in recesses formed to receive them in the swivel-bed are two plungers 23 23', one located on either side of the pinion 21, as shown in Fig. 4. Each of said plungers is beveled at its upper end, as shown, and is provided on its inner side with a rack 24, arranged to engage the pinion 21. 25 25' are the dogs carried by the work-table and arranged to engage the beveled upper ends of the plungers 23 23' to depress the same. As shown in the drawings, each of the dogs is provided with a nut 26, which nut is screwed on a bolt 27, the head of which is held in the T-slot 28, formed in the work-table, whereby the dogs may be adjusted on the table and held in any adjusted position. One of the plungers (as shown in the drawings the plunger 23') has a slot 29 cut in its outer side, as shown in Fig. 4, forming shoulders 30 30'. Arranged to slide in suitable recesses formed in the swivel-bed are two locking pins or stops 31 31', located on opposite sides of the pinion 32, loosely mounted in a recess formed in the swivel-bed. Each of said locking-pins is provided on its inner side with a rack 33, arranged to engage the pinion 32. The pinion is held in place in its recess by a screw 34.

The operation of the mechanism above described is as follows: With the hand-lever 22 in vertical position both of the plungers 23 23' will be held in midway position, as shown in full lines in Fig. 4, and the clutch 17 will likewise be held in midway position and out of engagement with both of the bevel-gears 15 15', as shown in the drawings. When now the lever 22 is turned to the right or to the left to shift the clutch into engagement with one or the other of said bevel-gears, one of the plungers 23 23' will be thrown upward into the path of the dogs on the carriage, while the other plunger will be moved downward. Assuming the lever 22 to be thrown to the right and so as to engage the clutch 17 with the bevel-gear 15', the plunger 23 will by such movement of the lever be thrown upward and the plunger 23' thrown downward into the respective positions indicated by dotted lines in Fig. 4. As the feed-screw is revolved by the gear 15' the work-table will be fed from left to right in Fig. 4 and will continue to be so fed until the dog 25 in its movement depresses the plunger 23 far enough to cause the disengagement of the clutch from the bevel-gear 15', when the feeding movement of the table will cease. The downward movement of the plunger effects the disengagement of the clutch by means of the rack 24, which serves to turn the pinion 21, and thus rock the clutch-shaft 20. In Fig. 4 the parts are shown with the dog 25 just coming in contact with the beveled end of the plunger 23 in its elevated or dotted-line position. The table will come to rest with the dog 25 above the plunger 23; but this will not prevent the shifting of the clutch to engage the other bevel-gear 15 for the reverse feed, because the movement of the lever 22 to shift the clutch in the proper direction to engage the bevel-gear 15 will serve to lower and not to raise the plunger 23, the companion plunger 23' instead being raised into position to be actuated by the other dog 25' to stop the feed in the reverse direction. Thus the necessity of beginning the reverse feed by hand and running the table back by hand far enough to clear the dog from the plunger is entirely obviated. The clutch may be shifted and the automatic feed brought into operation at once.

Another advantage resulting from the two-plunger arrangement above described is that the automatic feed may be availed of for very short feeds—as, for instance, in milling a short slot, say one-quarter of an inch in length. With the single-plunger arrangement heretofore employed and in which both dogs actuated the same plunger when one dog has depressed the plunger and has come to rest above the plunger the other dog must be at least a sufficient distance away from the plunger on the other side to permit the table to be fed by hand far enough for the dog which is holding the plunger down to clear the plunger, and thus permit the clutch to be shifted. The extent of the hand-feed required to clear the dog from the plunger would be ordinarily more than a quarter of an inch, with the result that to mill a slot of that length the feed would have to be entirely by hand and the automatic feed could not be used at all. With the two-plunger arrangement above described the clutch may be shifted and the automatic feed set in operation at once, notwithstanding the presence of the dog above the plunger which is actuated, while the other dog may be set as close to its plunger as may be desired and so that not only is the automatic feed available for the reverse feed, but such automatic feed may be as short as desired. In Fig. 4 a dotted circle represents a position to which the dog 25' may be adjusted and which would cause a very short feed of the table, but one which would be automatic in both directions and which would also be automatically thrown out. It will further be seen that the construction is such that either one of the plungers may be actuated or depressed by either one of the dogs on the work-table. Thus, assuming the plunger 23 to be in its elevated position, as indicated in dotted lines in Fig. 4, said plunger may be depressed by either one of the dogs 25 25', according to the direction in which the work-table is moving at the time, and so, also, with respect to the plunger 23' if the position of the clutch be such as to cause said plunger 23' to be in its elevated position. This feature is of especial importance when by reason of other reversing mechanism embodied in the machine the rotation of the shaft 13 is sometimes in one direction and sometimes in the opposite direction. It is also to be noted that when the feed mechanism is tripped by the depression of the plunger which during that feeding movement was in its elevated position and the feed thereby stopped both plungers are in their inactive position and remain in that position until the other plunger is moved to its elevated position by some means other than the dog on the work-table. In other words, the depression of one plunger by the coöperating dog does not serve to elevate the other plunger into operative position, but some other means is required to elevate the other plunger.

In the arrangement shown in the drawings both plungers remain in their inactive position and the clutch of the feed mechanism remains in its central or neutral position until the lever 22 is moved by hand to shift the clutch to start the feed in the reverse direction, the movement of said lever serving to elevate the other plunger into the path of the dogs on the table. If desired, mechanism may be provided to shift the clutch and throw in the reverse feed automatically—that is, to automatically shift the clutch into engagement with one of the bevel-gears immediately after it has been disconnected from the other bevel-gear—and in such case this automatic mechanism will constitute the means to elevate the other plunger into position to be engaged by the dog on the work-table.

It often happens that the automatic reverse feed is not required—that is, that the table after being automatically fed in one direction and the feed automatically thrown out is run back by hand, doing no work on this return movement. In such case the clutch is shifted by hand only in one direction—that is, only in a direction to engage one of the bevel-gears—and it is desirable that the clutch should not be accidentally shifted into engagement with the wrong gear. The locking-pin arrangement above described effectively serves to prevent any such accidental engagement. Where the automatic feed in both directions is employed, the locking-pins are in the position shown in Fig. 4—that is, both pins are withdrawn to one side of the path of movement of the plunger 23' and so that the handle 22 may be turned and the clutch shifted into engagement with either one of the bevel-gears. If now it be desired that the clutch should be shifted only into engagement with the bevel-gear 15, for instance, the upper locking-pin 31 is pushed inward, so that its inner end will enter the slot 29 in the plunger 23'. With the locking-pin 31 in this position it will be seen that the lever 22 cannot be turned to the right because of the engagement of the upper shoulder 30 on the plunger 23' with the inner end of the locking-pin 31, which will prevent the downward movement of said plunger below its midway position, and thus prevent the turning of the lever 22 in a direction to engage the clutch with the bevel-gear 15'. The lever 22, however, will not be prevented from being turned to the left, because the plunger 23' will be free to rise and the plunger 23 consequently free to be lowered. Thus with the locking-pin 31 pushed in the clutch can be engaged with the bevel-gear 15, but cannot be thrown into engagement with the bevel-gear 15'. If, on the other hand, the lower locking-pin 31' be pushed inward, so that its inner end will enter the slot 30, then the plunger 23' cannot be raised above its midway position, and consequently the lever 22 cannot be thrown to the left, but can only be turned to the right to engage the clutch with the gear 15'. It will be noted that the pushing in of one of the locking-pins serves, by means of the interposed connecting-pinion 32, to retract the other pin. It will also be observed that with the lever 22 and plunger 23 23' in midway position either locking-pin can be pushed inward, so as to project its inner end into the slot 30. The locking-pins 31 31' also serve a useful purpose in connection with throwing out the feed by hand. In shifting the clutch by hand there is a liability that in withdrawing the clutch from one of the bevel-gears it may accidentally be carried over into engagement with the opposite gear. With the proper locking-pin projected into the slot 30 this is rendered impossible.

The means for connecting the clutch-shaft 20 with the clutch, consisting of the eccentric-pin rigid with the shaft and entering a hole in the clutch-shoe, is a very simple and efficient arrangement, doing away with the complicated and jointed connections heretofore employed and enabling a large amount of leverage to be obtained for operating the clutch.

What I claim as my invention, and desire to secure by Letters Patent, is—

1. The combination, with a movable member provided with dogs, and mechanism for feeding said movable member, of mechanism for tripping said feed mechanism, said tripping mechanism embodying two plungers either of which is adapted to be engaged by either of the dogs on the movable member.

2. The combination, with a movable member provided with dogs, and mechanism for feeding said movable member in reverse directions, of mechanism for tripping said feed mechanism, said tripping mechanism embodying two plungers to be engaged by the dogs on the movable member, one of said dogs serving to depress the elevated plunger and throw out the feed, and means independent of said dog for throwing in the reverse feed and elevating the other plunger into the path of said dogs.

3. The combination with a movable member provided with dogs, and mechanism for feeding said movable member in reverse directions of mechanism for tripping said feed mechanism, said tripping mechanism embodying two plungers to be engaged by the dogs on the movable member, the plungers being connected together so that when the plunger which stands in the path of the dogs is depressed by one of the dogs to throw out the feed, both plungers will be brought to a midway position out of the path of the dogs, and will remain in that position until the reverse feed is thrown in, the throwing in of the reverse feed serving to elevate the other plunger into the path of the dogs.

4. The combination, with a movable member provided with dogs, and mechanism for feeding said movable member, of mechanism for tripping said feed mechanism, said tripping mechanism embodying two plungers to be engaged by the dogs on the movable member, said plungers being adapted to be moved into and out of the path of movement of said dogs, and a movable stop adapted to be moved into position to prevent one of said plungers from being moved into the path of movement of the dogs.

5. The combination, with a reversible feed mechanism embodying a shifting clutch, of mechanism for throwing out said clutch to trip and stop the feed, said clutch-shifting mechanism embodying two plungers for actuating said clutch, one of said plungers being adapted to throw out said clutch in one direction and the other plunger being adapted to throw out said clutch in the opposite direction, and means for throwing in said clutch to start the reverse feed.

6. The combination, with a reversible feed mechanism embodying a pair of gears and an intermediate shifting clutch, of mechanism for moving said clutch out of engagement with each of said gears, said clutch mechanism embodying two plungers one adapted to move the clutch out of engagement with one of said gears and the other adapted to move the clutch out of engagement with the other gear, and means for throwing said clutch into engagement with one or the other of said gears.

7. The combination, with a reversible feed mechanism embodying a pair of gears and an intermediate shifting clutch, of mechanism for shifting said clutch, said clutch-shifting mechanism embodying a rock-shaft, and two plungers, one plunger adapted to throw the clutch out of engagement with one of said gears and the other plunger adapted to throw the clutch out of engagement with the other gear, and means to rock said shaft to throw said clutch into engagement with one or the other of said gears.

8. The combination, with a reversible feed mechanism embodying a pair of gears and an intermediate shifting clutch, of mechanism for shifting said clutch, said clutch-shifting mechanism embodying two plungers one adapted to shift the clutch out of engagement with one of said gears and the other adapted to shift the clutch out of engagement with the other gear, of a movable stop adapted to be moved into position to prevent the clutch from being thrown into engagement with one of said gears.

9. The combination, with a reversible feed mechanism embodying a pair of gears and an intermediate shifting clutch, of mechanism for shifting said clutch and means which may be adjusted to prevent said clutch from being thrown into engagement with one of said gears, while permitting its engagement with the other gear.

10. The combination, with a reversible feed mechanism embodying a pair of gears and an intermediate shifting clutch, of mechanism for shifting said clutch, and a pair of movable stops normally in position to permit the engagement of said clutch with either of said gears, one of said stops being adapted to be moved into position to prevent the engagement of the clutch with one of said gears, and the other stop being adapted to be moved into position to prevent the engagement of the clutch with the other gear.

11. The combination of a shifting clutch, a rock-shaft for operating the same, two plungers adapted to actuate said rock-shaft, shoulders or projections on one of said plungers, and movable stops or pins adapted to engage said shoulders or projections.

JOHN PARKER.

Witnesses:
C. G. BRADLEY,
J. H. THURSTON.